(12) United States Patent
Watanabe

(10) Patent No.: US 10,215,357 B2
(45) Date of Patent: Feb. 26, 2019

(54) VEHICULAR LAMP

(71) Applicant: Koito Manufacturing Co., Ltd., Tokyo (JP)

(72) Inventor: Tomoyuki Watanabe, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 15/808,049

(22) Filed: Nov. 9, 2017

(65) Prior Publication Data

US 2018/0142859 A1 May 24, 2018

(30) Foreign Application Priority Data

Nov. 22, 2016 (JP) ................................ 2016-227274

(51) Int. Cl.
| | |
|---|---|
| *F21V 1/00* | (2006.01) |
| *F21S 41/36* | (2018.01) |
| *F21S 41/24* | (2018.01) |
| *F21S 41/47* | (2018.01) |
| *F21S 43/14* | (2018.01) |

(Continued)

(52) U.S. Cl.
CPC ............ *F21S 41/36* (2018.01); *B60Q 1/0041* (2013.01); *B60Q 1/0058* (2013.01); *B60Q 1/14* (2013.01); *B60Q 1/18* (2013.01); *F21S 41/141* (2018.01); *F21S 41/148* (2018.01); *F21S 41/19* (2018.01); *F21S 41/192* (2018.01); *F21S 41/24* (2018.01); *F21S 41/336* (2018.01); *F21S 41/43* (2018.01); *F21S 41/47* (2018.01); *F21S 41/663* (2018.01); *F21S 43/14* (2018.01); *F21S 43/195* (2018.01); *F21S 43/236* (2018.01); *F21S 43/237* (2018.01); *F21S 43/245* (2018.01); *F21S 43/31* (2018.01); *F21S 43/40* (2018.01); *B60Q 2400/30* (2013.01); *F21W 2102/00* (2018.01);

(Continued)

(58) Field of Classification Search
CPC ........ F21S 41/36; F21S 41/366; F21S 41/663; F21S 41/43; F21S 41/19; F21S 41/148; F21S 41/47; F21S 41/24; F21S 41/192; F21S 43/237; F21S 43/40; F21S 43/245; F21S 43/236; F21S 43/195; F21S 43/14; F21S 43/31; B60Q 1/0058; B60Q 1/0041; B60Q 1/18; B60Q 1/14; B60Q 2400/30; F21W 2103/00; F21W 2103/55; F21W 2102/00

See application file for complete search history.

(56) References Cited

U.S. PATENT DOCUMENTS

| | | | |
|---|---|---|---|
| 2013/0271974 A1* | 10/2013 | Kuhn | F21K 9/00 362/231 |
| 2017/0334340 A1* | 11/2017 | Madril | B60Q 1/0023 |

FOREIGN PATENT DOCUMENTS

JP 2014-170629 A 9/2014

\* cited by examiner

*Primary Examiner* — Ali Alavi
(74) *Attorney, Agent, or Firm* — Abelman, Frayne & Schwab

(57) ABSTRACT

Provided is a lamp unit including a reflector that reflects and controls light emitted from first and second light emitting elements. The reflector includes first and second reflective surfaces. In addition, the light emitted from the first light emitting element in a headlamp lighting mode (a first lighting mode) is incident on the first reflective surface and not on the second reflective surface, and the light emitted from the second light emitting element in a daytime running lamp lighting mode (a second lighting mode) is incident on the first and second reflective surfaces.

7 Claims, 8 Drawing Sheets

(51) Int. Cl.
*F21S 41/19* (2018.01)
*F21S 43/31* (2018.01)
*F21S 41/141* (2018.01)
*F21S 43/19* (2018.01)
*F21S 43/236* (2018.01)
*B60Q 1/14* (2006.01)
*B60Q 1/18* (2006.01)
*B60Q 1/00* (2006.01)
*F21S 41/33* (2018.01)
*F21S 41/43* (2018.01)
*F21S 41/663* (2018.01)
*F21S 43/237* (2018.01)
*F21S 43/245* (2018.01)
*F21S 43/40* (2018.01)
*F21S 41/148* (2018.01)
*F21Y 115/10* (2016.01)
*F21W 103/55* (2018.01)
*F21W 102/00* (2018.01)
*F21W 103/00* (2018.01)

(52) U.S. Cl.
CPC ..... *F21W 2103/00* (2018.01); *F21W 2103/55* (2018.01); *F21Y 2115/10* (2016.08)

VEHICULAR LAMP

CROSS-REFERENCE TO RELATED APPLICATIONS

This application is based on and claims priority from Japanese Patent Application No. 2016-227274, filed on Nov. 22, 2016, with the Japan Patent Office, the disclosure of which is incorporated herein in its entirety by reference.

TECHNICAL FIELD

The present disclosure relates to a vehicular lamp configured to reflect and control light emitted from first and second light emitting elements by a reflector.

BACKGROUND

In the related art, it has been known that a vehicular lamp is configured to reflect and control light emitted from a first light emitting element that is lit in a first lighting mode and light emitted from a second light emitting element that is lit in a second lighting mode by a reflector.

Japanese Patent Laid-Open Publication No. 2014-170629 describes a reflector in a vehicular lamp in which a first reflector configured to reflect and control light emitted from a first light emitting element and a second reflector configured to reflect and control light emitted from a second light emitting element are disposed such that the second reflector is positioned on the rear side of the first reflector.

In the vehicular lamp described in Japanese Patent Laid-Open Publication No. 2014-170629, the first reflector is formed of a light-transmitting material, and a light reflective region and a light transmitting region are formed on the front surface of the first reflector. Further, the light reflected from the second reflector is configured to transmit the first reflector in the light transmitting region.

SUMMARY

In the vehicular lamp described in Japanese Patent Laid-Open Publication No. 2014-170629, a partial region of the first reflector may be caused to emit light in any of the first and second lighting modes, but the first reflector may not emit light over a wide range.

The present disclosure has been made in view of the above-described circumstances and provides a vehicular lamp that may cause a reflector to emit light in a second lighting mode over a wide range. The vehicular lamp is configured to reflect and control the light emitted from a first light emitting element to be lit in a first lighting mode and the light emitted from a second light emitting element to be lit in a second lighting mode.

The present disclosure achieves the above-described object by studying a method of incidence of the light emitted from each of the first and second light emitting elements on a reflector.

That is, the vehicular lamp according to the present disclosure includes: a first light emitting element that is lit in a first lighting mode; a second light emitting element that is lit in a second lighting mode; and a reflector that reflects and controls the lights emitted from the first and second light emitting elements. The reflector includes first and second reflective surfaces. The light emitted from the first light emitting element is configured to be incident on the first reflective surface and not on the second reflective surface, and the light emitted from the second light emitting element is configured to be incident on the first and second reflective surfaces.

The specific lighting modes of the "first lighting mode" and "second lighting mode" are not particularly limited.

The types of the "first and second light emitting elements" are not particularly limited, and for example, light emitting diodes or laser diodes may be adopted.

A positional relationship between the "first and second light emitting elements" and a positional relationship between the "first and second reflective surfaces" are not particularly limited.

The above-described "the light emitted from the first light emitting element is configured to be incident on the first reflective surface and not on the second reflective surface" includes not only an aspect in which the light emitted from the first light emitting element is not incident on the second reflective surface at all, but also an aspect in which the light emitted from the first light emitting element is incident on the second reflective surface as a light not affecting the function of a lamp in the first lighting mode.

The vehicular lamp according to the present disclosure is configured such that the vehicular lamp includes first and second reflective surfaces as reflectors that reflect and control the light emitted from the first and second light emitting elements and that the light emitted from the first light emitting element to be lit in the first lighting mode is incident on the first reflective surface and not on the second reflective surface, and the light emitted from the second light emitting element to be lit in the second lighting mode is incident on the first and second reflective surfaces. Thus, the following effects may be obtained.

That is, the first reflective surface on which the light emitted from the first light emitting element is incident may be preferentially used as a reflective region configured to form a first light distribution pattern in the first lighting mode, and the first and second reflective surfaces on which the light emitted from the second light emitting element is incident may be used as a reflective region configured to form a second light distribution pattern in the second lighting mode.

At this time, since the light emitted from the first light emitting element is not incident on the second reflective surface, the second reflective surface may be used as a dedicated reflective region that forms a second light distribution pattern.

Thus, after the first and second light distribution patterns may be efficiently formed, both the first and second reflective surfaces may be caused to emit light in the second lighting mode.

According to the present disclosure, in a vehicular lamp configured to reflect and control the light emitted from a first light emitting element to be lit in a first lighting mode and the light emitted from a second light emitting element to be lit in a second lighting mode by a reflector, the reflector may be caused to emit light over a wide range in the second lighting mode.

In the above-described configuration, when the first lighting mode is a headlamp lighting mode and the second lighting mode is a daytime running lamp lighting mode, the following effects may be obtained.

That is, in the headlamp lighting mode, a light distribution pattern for a headlamp (e.g., a low beam light distribution pattern or a high beam light distribution pattern) may be formed by the light reflected from the first reflective surface. In the daytime running lamp lighting mode, a light distribution pattern for a daytime running lamp may be formed by the light reflected from the first and second reflective surfaces. At that time, since the reflector emits light over a wide range, it is possible to easily recognize that the lamp emits light when it is viewed from the outside even in daylight.

In the above-described configuration, when a light-shielding member is provided so that the light emitted from the first light emitting element is not incident on the second reflective surface, it is possible to reliably suppress the light emitted from the first light emitting element from being incident on the second reflective surface with a simple configuration.

It is also possible to suppress the light emitted from the first light emitting element from being incident on the second reflective surface by studying, for example, the arrangement of the first and second light emitting elements or the arrangement of the first and second reflective surfaces instead of adopting a configuration including the above-described light-shielding member.

In the above-described configuration, when a sub-reflector is provided which reflects a portion of the lights emitted from the second light emitting element and reflected on the second reflective surface toward the first reflective surface, it becomes possible to easily set the direction of the lights reflected from the first reflective surface to a desired direction. Thus, it is possible for the first reflective surface to emit brighter light in the lighting mode in which the second light emitting element is lit.

In the above-described configuration, when the first and second light emitting elements are mounted on a common substrate, the number of components may be reduced and the configuration of the lamp may be simplified.

In the above-described configuration, when a sub light source is configured to be lit in the second lighting mode to cause light to be incident on the first reflective surface, it is possible to cause the first reflective surface to emit brighter light in the lighting mode in which the second light emitting element is lit. The specific configuration of the term "sub light source" is not particularly limited.

In the above-described configuration, in the second lighting mode, when the first light emitting element is configured to be lit in a state of being dimmed more than when the first light emitting element is lit in the first lighting mode, the reflector may be caused to emit light over a wide range in the second lighting mode without using a new member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4A is a low beam light distribution pattern, FIG. 4B is a high beam light distribution pattern, and FIG. 4C is a light distribution pattern for a daytime running lamp.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, exemplary embodiments of the present disclosure will be described with reference to the accompanying drawings.

Figure 1:
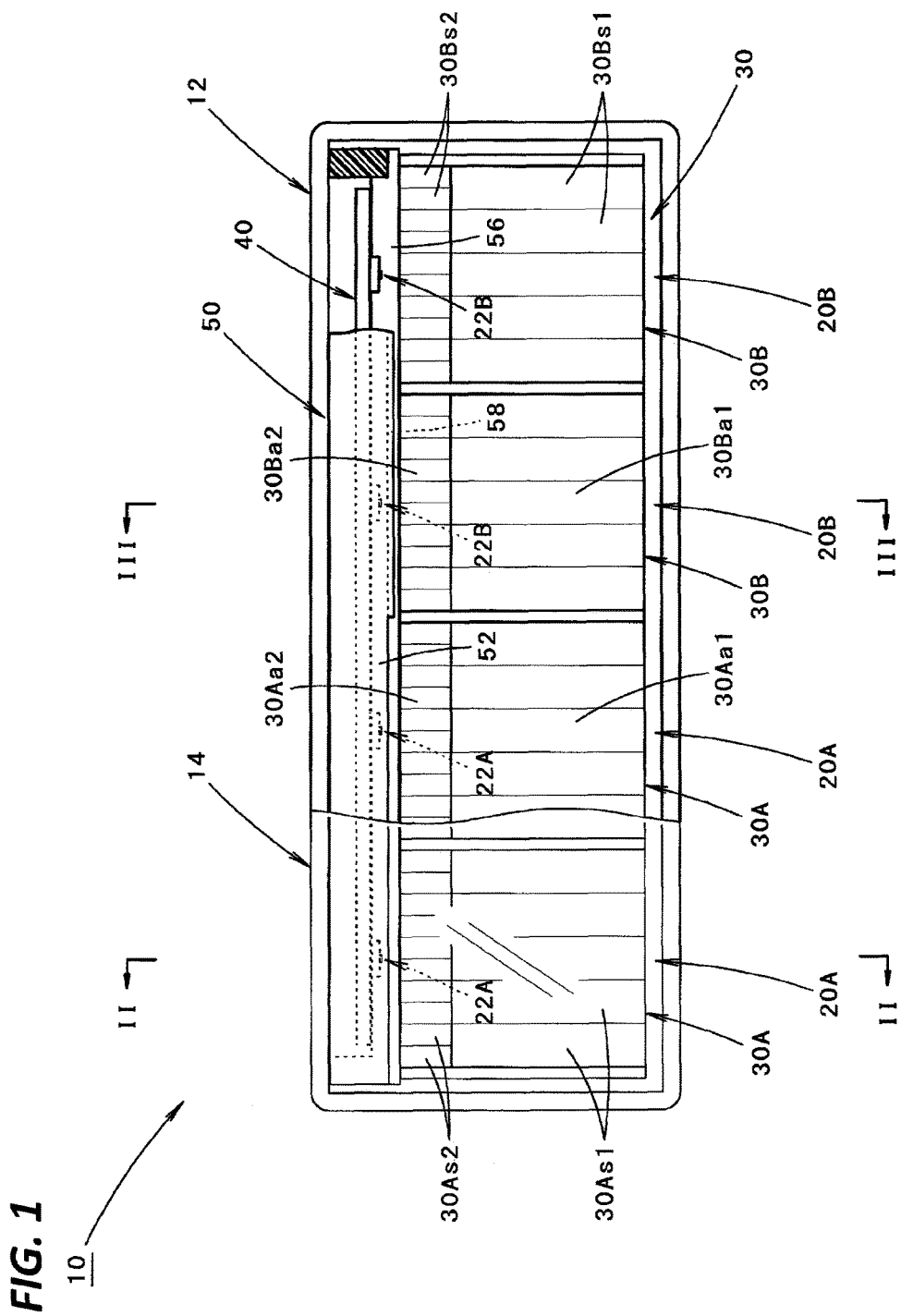
FIG. 1 is a partially sectional front view of a vehicular lamp according to an exemplary embodiment of the present disclosure.
Figure 2:
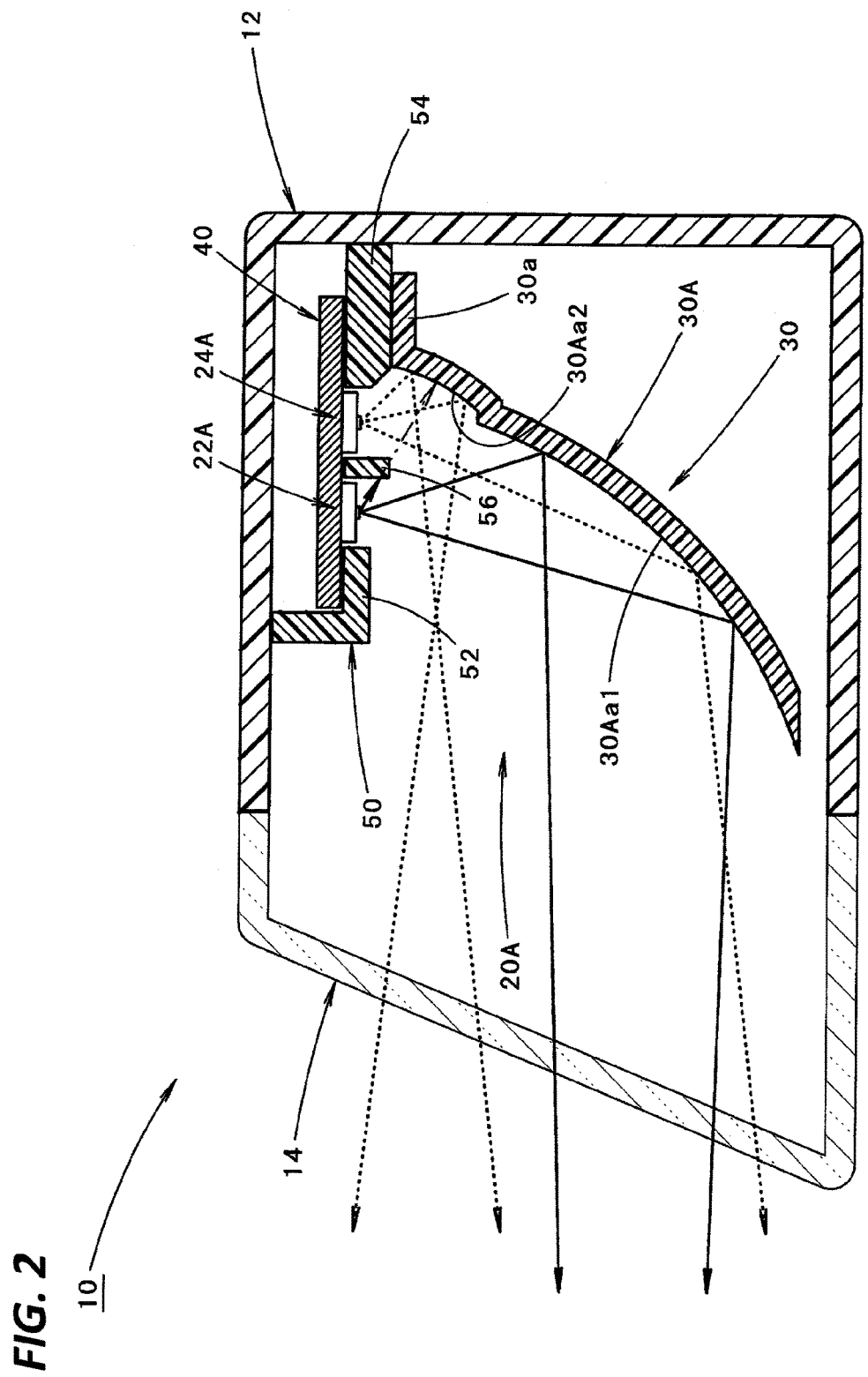
FIG. 2 is a sectional view taken along line II-II of FIG. 1.
Figure 3:
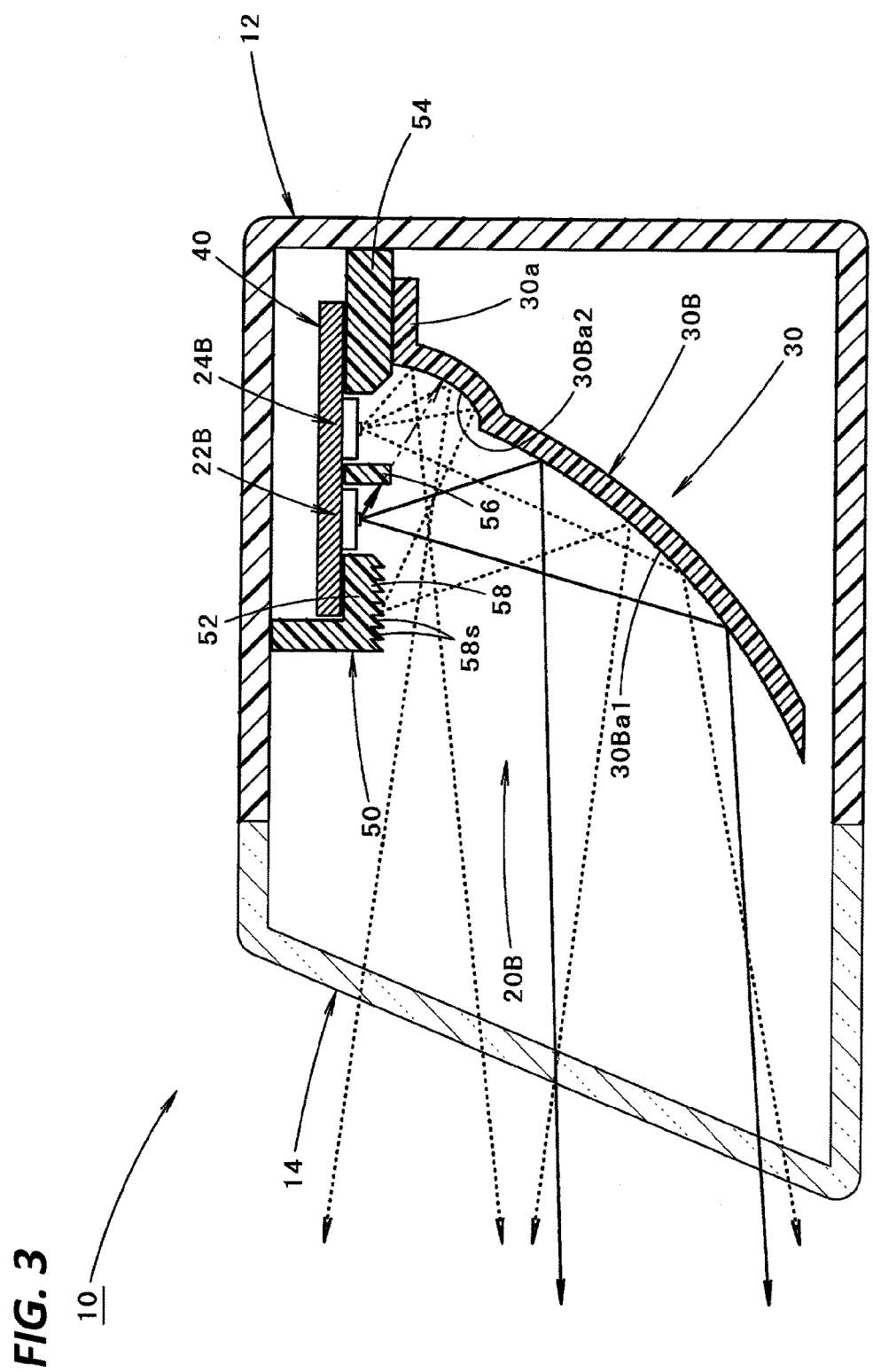
FIG. 3 is a sectional view taken along line III-III of FIG. 1.

FIG. 1 is a partially sectional front view of a vehicular lamp 10 according to an exemplary embodiment of the present disclosure. Further, FIG. 2 is a sectional view taken along line II-II of FIG. 1, and FIG. 3 is sectional view taken along line III-III of FIG. 1.

As illustrated in these figures, the vehicular lamp 10 according to the exemplary embodiment of the present disclosure is a lamp disposed at the front end of a vehicle and function as both a head lamp and a daytime running lamp.

The vehicular lamp 10 has a configuration in which four lamp units 20A and 20B are inserted in parallel in a vehicle width direction within a lamp chamber formed by a lamp body 12 and a transparent translucent cover 14 attached at the front end opening of the lamp body 12.

Further, in this vehicular lamp 10, two lamp units 20B are used in a low beam illumination mode in a head lamp lighting mode, two lamp units 20A are additionally used in a high beam illumination mode in a head lamp lighting mode, and four lamp units 20A and 20B may be used in a daytime running lamp lighting mode.

The two lamp units 20A for high beam illumination have the same configurations. That is, each of the lamp units 20A includes first and second light emitting elements 22A and 24A and a reflector 30A that reflects the light emitted from the first and second light emitting elements 22A and 24A forward.

In the meantime, the two lamp units 20B for low beam illumination have the same configurations. That is, each of the lamp units 20B includes first and second light emitting elements 22B and 24B and a reflector 30B that reflects the light emitted from the first and second light emitting elements 22B and 24B forward.

The first and second light emitting elements 22A and 24A of each lamp unit 20A are arranged downward at intervals in the longitudinal direction. Further, the first and second light emitting elements 22B and 24B of each lamp unit 20B are arranged downward at intervals in the longitudinal direction.

The first and second light emitting elements 22A and 24A and the first and second light emitting elements 22B and 24B are each configured as a white light emitting diode having a rectangular (e.g., square) light emitting surface.

The first light emitting element 22A of each lamp unit 20A is configured to be lit in the high beam illumination mode in the head lamp lighting mode, and the first light emitting element 22B of each lamp unit 20B is configured to be lit in the low beam illumination mode and the high beam illumination mode in the head lamp lighting mode.

In the meantime, the second light emitting element 24A of each lamp unit 20A and the second light emitting element 24B of each lamp unit 20B are configured to be lit in the daytime running lamp lighting mode.

The first and second light emitting elements 22A and 24A of each lamp unit 20A and the first and second light emitting elements 22B and 24B of each lamp unit 20B are mounted on the lower surface of a common substrate 40 horizontally arranged so as to extend in the vehicle width direction. The substrate 40 is supported on a support member 50 on the bottom surface thereof.

The support member 50 is supported by the lamp body 12 in a state of being arranged to extend in the vehicle width direction.

In the support member 50, a portion located on the front side of the first light emitting elements 22A and 22B of each of the lamp units 20A and 20B is configured as a thin-walled portion 52, a portion located on the rear side of the second light emitting elements 24A and 24B of each of the lamp units 20A and 20B is configured as a thick-walled portion 54, and a portion located between the first light emitting elements 22A and 22B and the second light emitting elements 24A and 24B is configured as a light-shielding portion 56 (to be described later).

The support member 50 has a top surface extending along the horizontal plane and a front end portion and left and right end portions extending upward from the upper surface of the support member 50 so as to cover the substrate 40.

The reflector 30A of each lamp unit 20A and the reflector 30B of each lamp unit 20B are integrally formed as a reflector continuous body 30.

The reflector continuous body 30 is supported by the thick-walled portion 54 of the support member 50 at a flange portion 30a formed in the upper end portion thereof.

Next, the specific configuration of the reflector 30A of each lamp unit 20A and the reflector 30B of each lamp unit 20B will be described.

First, the specific configuration of the reflector 30A will be described.

The reflector 30A includes first and second reflective surfaces 30Aa1 and 30Aa2. The first and second reflective surfaces 30Aa1 and 30Aa2 have a rectangular outer shape as a whole when viewed from the front of the lamp and are formed in two upper and lower tiers in the vertical direction so that the first reflective surface 30Aa1 is positioned on the rear side of the second reflective surface 30Aa2. At this time, the second reflective surface 30Aa2 is formed to have a smaller vertical width than the first reflective surface 30Aa1 (specifically, a vertical width of ⅓ or less (e.g., a vertical width of about ¼)).

The first reflective surface 30Aa1 is arranged so as to be positioned below the first light emitting element 22A. The first reflective surface 30Aa1 includes a plurality of reflecting elements 30As1 and reflects the light emitted from the first light emitting element 22A as the light slightly diffused in the vertical direction toward the front of the vehicle and also the light greatly diffused to both the left and right sides.

The second reflective surface 30Aa2 is arranged so as to be positioned below and near the slightly rear portion of the second light emitting element 24A. The second reflective surface 30Aa2 includes a plurality of reflecting elements 30As2 and reflects the light emitted from the second light emitting element 24A as the light slightly diffused in the vertical direction toward the front of the vehicle and also the light greatly diffused to both the left and right sides.

In each lamp unit 20A, the light emitted from the first light emitting element 22A toward the second reflective surface 30Aa2 is shielded by the light-shielding portion 56 of the support member 50 so that the light is not incident on the second reflective surface 30Aa2.

In the meantime, the light emitted from the second light emitting element 24A toward the first reflective surface 30Aa1 is not shielded by the light-shielding portion 56 of the support member 50 and is incident on the first reflective surface 30Aa1. At this time, since the second light emitting element 24A is positioned behind the first light emitting element 22A, the light emitted from the second light emitting element 24A is reflected as the light that is slightly downward on the first reflective surface 30Aa1.

Next, the specific configuration of the reflector 30B will be described.

The reflector 30B includes first and second reflective surfaces 30Ba1 and 30Ba2. The first and second reflective surfaces 30Ba1 and 30Ba2 have a rectangular outer shape as a whole when viewed from the front of the lamp and are formed in two upper and lower tiers in the vertical direction so that the first reflective surface 30Ba1 is positioned on the rear side of the second reflective surface 30Ba2. At this time, the second reflective surface 30Ba2 is formed to have a smaller vertical width than the first reflective surface 30Ba1 (specifically, a vertical width of ⅓ or less (e.g., a vertical width of about ¼)).

The first reflective surface 30Ba1 is arranged so as to be positioned below the first light emitting element 22B. The first reflective surface 30Ba1 includes a plurality of reflecting elements 30Bs1 and reflects the light emitted from the first light emitting element 22B as the light that is diffused slightly downward toward the front of the vehicle and also the light that is greatly diffused to both the left and right sides.

The second reflective surface 30Ba2 is arranged so as to be positioned below and near the slightly rear portion of the second light emitting element 24B. The second reflective surface 30Ba2 includes a plurality of reflecting elements 30Bs2 and reflects the light emitted from the second light emitting element 24B as the light slightly diffused in the vertical direction toward the front of the vehicle and also the light greatly diffused to both the left and right sides. At this time, the second reflective surface 30Ba2 is formed such that the upper region thereof is curved largely in the vertical section, and as a result, the light reflected from the lower region is reflected at a large angle in an obliquely upward direction.

In each lamp unit 20B, the light emitted from the first light emitting element 22B toward the second reflective surface 30Ba2 is shielded by the light-shielding portion 56 of the support member 50 so that the light is not incident on the second reflective surface 30Ba2.

In the meantime, the light emitted from the second light emitting element 24B toward the first reflective surface 30Ba1 is not shielded by the light-shielding portion 56 of the support member 50 and is incident on the first reflective surface 30Ba1. At this time, since the second light emitting element 24B is positioned behind the first light emitting element 22B, the light emitted from the second light emitting element 24B is reflected as the light that is slightly downward on the first reflective surface 30Ba1. However, the downward angle of the reflected light becomes larger than the downward angle of the light that is emitted from the second light emitting element 24A and reflected on the first reflective surface 30Aa1 in the lamp unit 20A. This is because the first reflective surface 30Ba1 is configured to reflect the light emitted from the first light emitting element 22B as a slightly downward light toward the front of the vehicle.

In the thin-walled portion 52 of the support member 50, a sub-reflector 58 is integrally formed with the thin-walled portion 52 at a portion where each lamp unit 20B is positioned.

The sub-reflector 58 includes a plurality of reflecting elements 58s that protrude in a sawtooth shape from the lower surface of the thin-walled portion 52. In the plurality of reflecting elements 58s, the sub-reflector 52 reflects the reflected light in the obliquely upward direction from the lower region of the second reflective surface 30Ba2 toward the first reflective surface 30Ba1.

At this time, since the sub-reflector 58 is positioned in front of the first light emitting element 22B, the reflected light from the sub-reflector, which is incident on the first reflective surface 30Ba1, is reflected as an obliquely upward light.

Also, in FIGS. 2 and 3, the light rays used in the headlamp lighting mode are indicated by solid lines, and the light rays used in the daytime running lamp lighting mode are indicated by dashed lines. The same is applied to various modifications to be described later.

Figure 4:
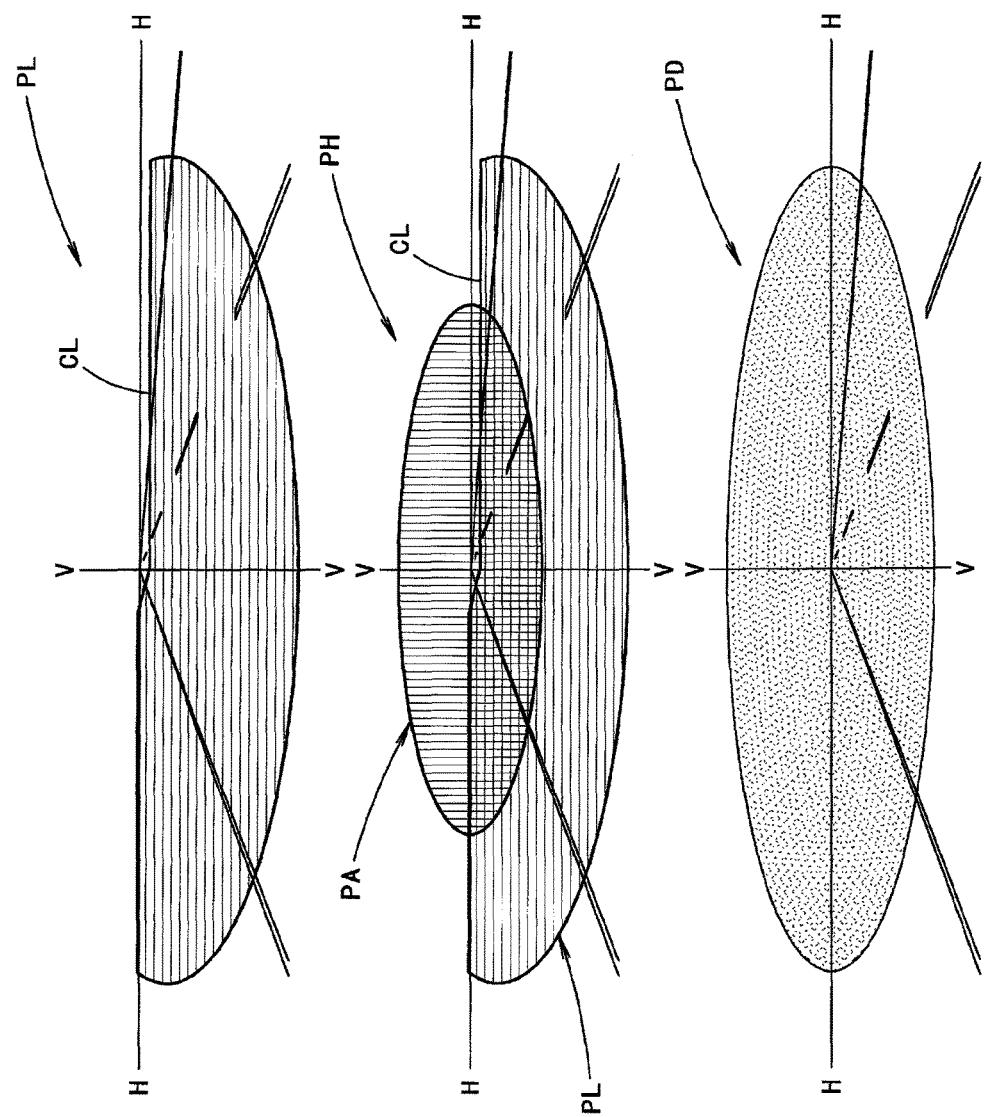
FIGS. 4A to 4C are perspective views illustrating a light distribution pattern formed by the light illuminated from the vehicular lamp.

FIGS. 4A to 4C are perspective views illustrating a light distribution pattern that is formed on a virtual vertical screen arranged in front of the vehicular lamp 10 by the light illuminated forward from the vehicular lamp 10.

The light distribution pattern illustrated in FIG. 4A is a low beam light distribution pattern PL, the light distribution pattern illustrated in FIG. 4B is a high beam light distribution pattern PH, and the light distribution pattern illustrated in FIG. 4C is a daytime running lamp light distribution pattern PD.

The low beam light distribution pattern PL illustrated in FIG. 4A is formed as a light distribution pattern obtained by combining two light distribution patterns that are formed by the lights reflected from the reflector 30B when the first light emitting elements 22B in two lamp units 20B are lit.

The low beam light distribution pattern PL is a low beam light distribution pattern of the left-sided light distribution, and has a cuff-off line CL with a significant left and right difference on the upper edge thereof.

The high beam light distribution pattern PH illustrated in FIG. 4B is formed as a light distribution pattern obtained by combining the low beam light distribution pattern PL and an additional light distribution pattern PA.

The additional light distribution pattern PA is formed as a light distribution pattern obtained by combining two light distribution patterns that are formed by the lights reflected from the reflector 30A when the first light emitting elements 22A in two lamp units 20A are lit.

The additional light distribution pattern PA is a horizontally long light distribution pattern that spreads to both left and right sides around H-V, which is a vanishing point in the front direction of the lamp, and is formed so that the cut-off line CL extends vertically.

The daytime running lamp light distribution pattern PD illustrated in FIG. 4(c) is formed as a light distribution pattern obtained by combining four light distribution patterns that are formed by the lights reflected from the reflectors 30A and 30B when the second light emitting elements 24A and 24B in four lamp units 20A and 20B are lit.

The daytime running lamp light distribution pattern PD is formed as a horizontally long light distribution pattern that spreads to both left and right sides around the H-V.

Next, the operational effects of the present exemplary embodiment will be described.

The vehicular lamp 10 according to the present exemplary embodiment is configured such that the lamp unit 20A for high beam illumination includes first and second reflective surfaces 30Aa1 and 30Aa2 as reflectors 30A that reflect and control the lights emitted from the first and second light emitting elements 22A and 24A, that the light emitted from the first light emitting element 22A to be lit in the headlamp lighting mode (first lighting mode) is incident on the first reflective surface 30Aa1 and not on the second reflective surface 30Aa2, and that the light emitted from the second light emitting element 24A to be lit in the daytime running lamp lighting mode (second lighting mode) is incident on the first and second reflective surfaces 30Aa1 and 30Aa2. Thus, the following operational effects may be obtained.

That is, after the first reflective surface 30Aa1 on which the light emitted from the first light emitting element 22A is incident is preferentially used as a reflective region configured to form the additional light distribution pattern PA for the high beam light distribution pattern PH (light distribution pattern to be formed in the first lighting mode), the first and second reflective surfaces 30Aa1 and 30Aa2 on which the light emitted from the second light emitting element 24A is incident may be used as a reflective region configured to form a daytime running lamp light distribution pattern PD (light distribution pattern to be formed in the second lighting mode).

At this time, since the light emitted from the first light emitting element 22A is not incident on the second reflective surface 22Aa2, the second reflective surface 30Aa2 may be used as a dedicated reflective region configured to form a daytime running lamp light distribution pattern PD.

Thus, after the high beam light distribution pattern PH and the daytime running lamp light distribution pattern PD may be efficiently formed, both the first and second reflective surfaces 30Aa1 and 30Aa2 may be caused to emit light in the daytime running lamp lighting mode.

Further, since the vehicular lamp 10 according to the present exemplary embodiment has the same configuration as the lamp unit 20A for high beam illumination even for the lamp unit 20B for low beam illumination, after the low beam light distribution pattern PL and the daytime running lamp light distribution pattern PD may be efficiently formed, both the first and second reflective surfaces 30Ba1 and 30Ba2 may be caused to emit light in the daytime running lamp lighting mode.

According to the present exemplary embodiment, in the vehicular lamp 10 configured to reflect and control the lights emitted from the first light emitting elements 22A and 22B to be lit in the headlamp lighting mode and the lights emitted from the second light emitting elements 24A and 24B to be lit in the daytime running lamp lighting mode by the reflectors 30A and 30B, the reflectors 30A and 30B may be caused to emit light over a wide range in the daytime running lamp lighting mode. Thus, it is possible to easily recognize that the vehicular lamp 10 emits light when the vehicular lamp 10 is viewed from the outside even in daylight.

Further, according to the present exemplary embodiment, since the light-shielding portion 56 is provided on the support member 50 as a light-shielding member configured to suppress the lights emitted from the first light emitting elements 22A and 22B from being incident on the second reflective surfaces 30Aa2 and 30Ba2, it is possible to reliably suppress the lights emitted from the first light emitting elements 22A and 22B from being incident on the second reflective surfaces 30Aa2 and 30Ba2 with a simple configuration.

Further, in the vehicular lamp 10 according to the present exemplary embodiment, the lamp unit 20B for low beam illumination includes a sub-reflector 58 that reflects a portion of the lights emitted from the second light emitting element 24B and reflected on the second reflective surface 30Ba2 toward the first reflective surface 30Ba1, it becomes possible to easily set the direction of the lights reflected from the first reflective surface 30Ba1 to a desired direction. Thus, it is possible to cause the first reflective surface 30Ba1 to emit brighter light in the daytime running lamp lighting mode.

At this time, the downward angle of the light that is emitted from the first light emitting element 22B and reflected on the first reflective surface 30Ba1 in the lamp unit 20B for low beam illumination becomes larger than the downward angle of the light that is emitted from the first light emitting element 22A and reflected on the first reflective surface 30Aa1 in the lamp unit 20A for high beam illumination. Thus, by providing the above-described sub-reflector 58, it is particularly effective to increase the light reflected upward from the first reflective surface 30Ba1 in the daytime running lamp lighting mode.

Further, according to the present exemplary embodiment, since the first and second light emitting elements 22A, 22B, 24A and 24B of each of the lamp units 20A and 20B are mounted on a common substrate 40, the number of components may be reduced and the configuration of the vehicular lamp 10 may be simplified.

According to the above-described exemplary embodiment, the light-shielding member is configured by the light-shielding portion 56 of the support member 50. However, the light-shielding member may be configured as a member independent of the support member 50.

According to the above-described exemplary embodiment, the sub-reflector 58 includes a plurality of reflecting elements 58s and is integrally formed with the thin-walled portion 52 of the support member 50. However, it is also possible to configure the sub-reflector 58 to have a single reflective surface and to configure the sub-reflector 58 as a member independent of the support member 50. In addition, it is also possible for the sub-reflector 58 to be provided not only in each lamp unit 20B but also in each lamp unit 20A.

According to the above-described exemplary embodiment, the reflector 30A of each lamp unit 20A is arranged on the lower sides of the first and second light emitting elements 22A and 24A, and the reflector 30B of each lamp unit 20B is arranged on the lower sides of the first and second light emitting elements 22B and 24B. However, it is also possible to arrange the reflector 30A of each lamp unit 20A at a position other than the lower side (e.g., the upper side or the lateral side).

According to the above-described exemplary embodiment, a first lighting mode is a headlamp lighting mode and a second lighting mode is a daytime running lamp lighting mode. However, it is also possible to adopt a combination of other lighting modes (e.g., the first lighting mode is a headlamp lighting mode and the second lighting mode is a clearance lamp lighting mode).

Next, a modification of the present exemplary embodiment will be described.

First, a first modification of the present exemplary embodiment will be described.

Figure 5:
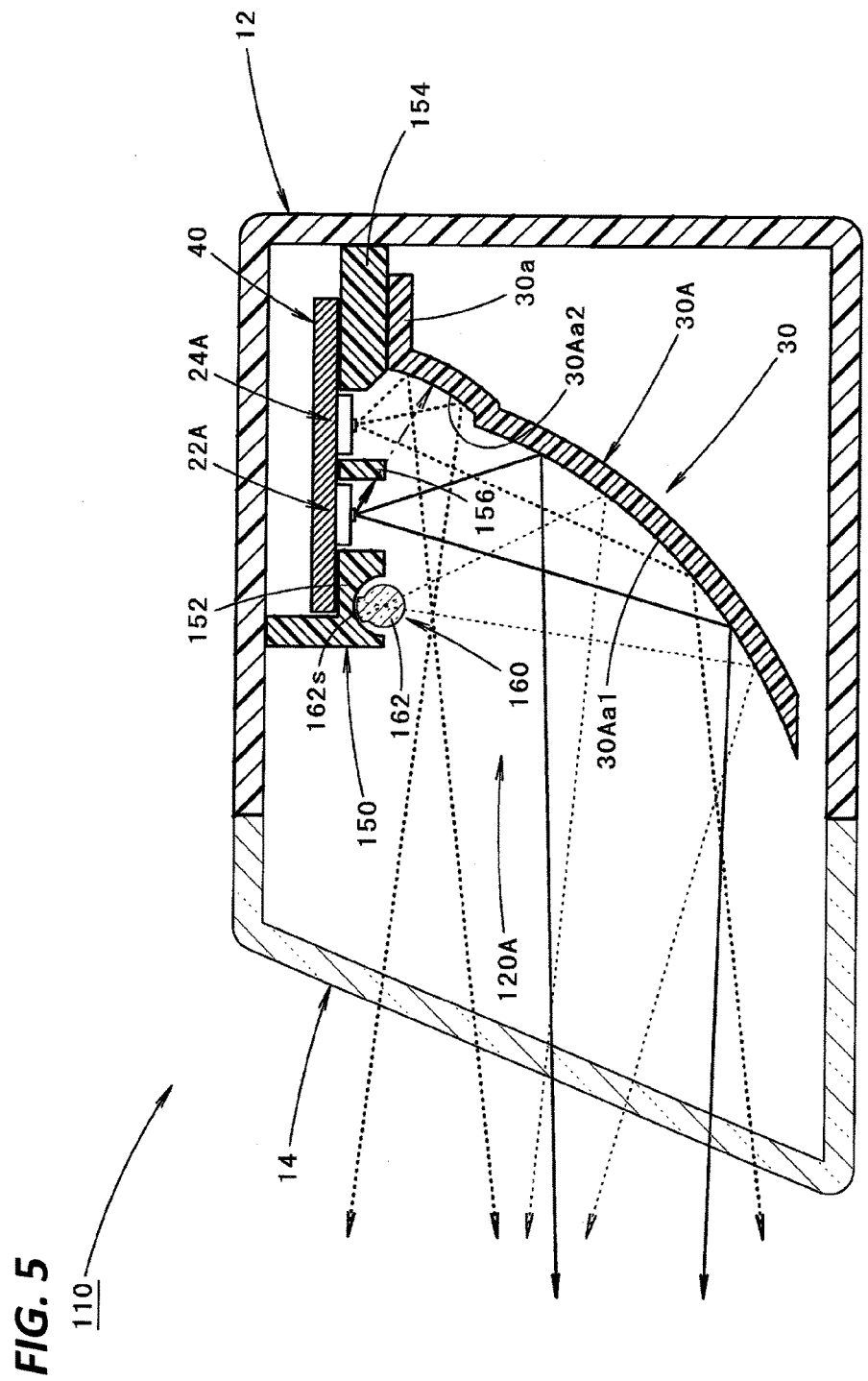
FIG. 5 is a view illustrating a first modification of the exemplary embodiment, which is the same as FIG. 2.

FIG. 5 is a view illustrating a vehicular lamp 110 according to the present modification, which is the same as FIG. 2.

As illustrated in this figure, the basic configuration of the vehicular lamp 110 is the same as the vehicular lamp 10 according to the above-described exemplary embodiment, but the present modification is different from the above-described exemplary embodiment in that a sub light source unit 160 is additionally arranged to be lit in the daytime running lamp lighting mode.

The sub light source unit 160 includes a pillar-shaped light guide 162 that extends in the vehicle width direction on the front side of the first light emitting element 22A in the lamp unit 120A and a light emitting element (not illustrated) such as a white light emitting diode arranged to cause light to be incident from the end surface of the light guide 162 to the light guide 162.

Further, the sub light source unit 160 reflects the light from the light emitting element guided in the light guide 162 on the inner surface of a plurality of reflecting elements 162s formed in the upper portion of the peripheral surface of the light guide 162 and then emits light from the lower portion of the light guide 162 toward the first reflective surface 30Aa1 of the reflector 30A.

At this time, since the light guide 162 is positioned in front of the first light emitting element 22A, the light emitted from the light guide 162 that is incident on the first reflective surface 30Aa1 is reflected as an obliquely upward light.

Further, in the present modification, since the light guide 162 is arranged, the support member 150 has a different shape from the lower surface of the thin-walled portion 152 in the above-described exemplary embodiment. However, the thick-walled portion 154 and the light-shielding portion 156 have the same shapes as in the above-described exemplary embodiment.

By adopting the configuration of the present modification, it is possible for the first reflective surface 30Aa1 to emit brighter light in the daytime running lamp lighting mode.

Next, a second modification of the present exemplary embodiment will be described.

Figure 6:
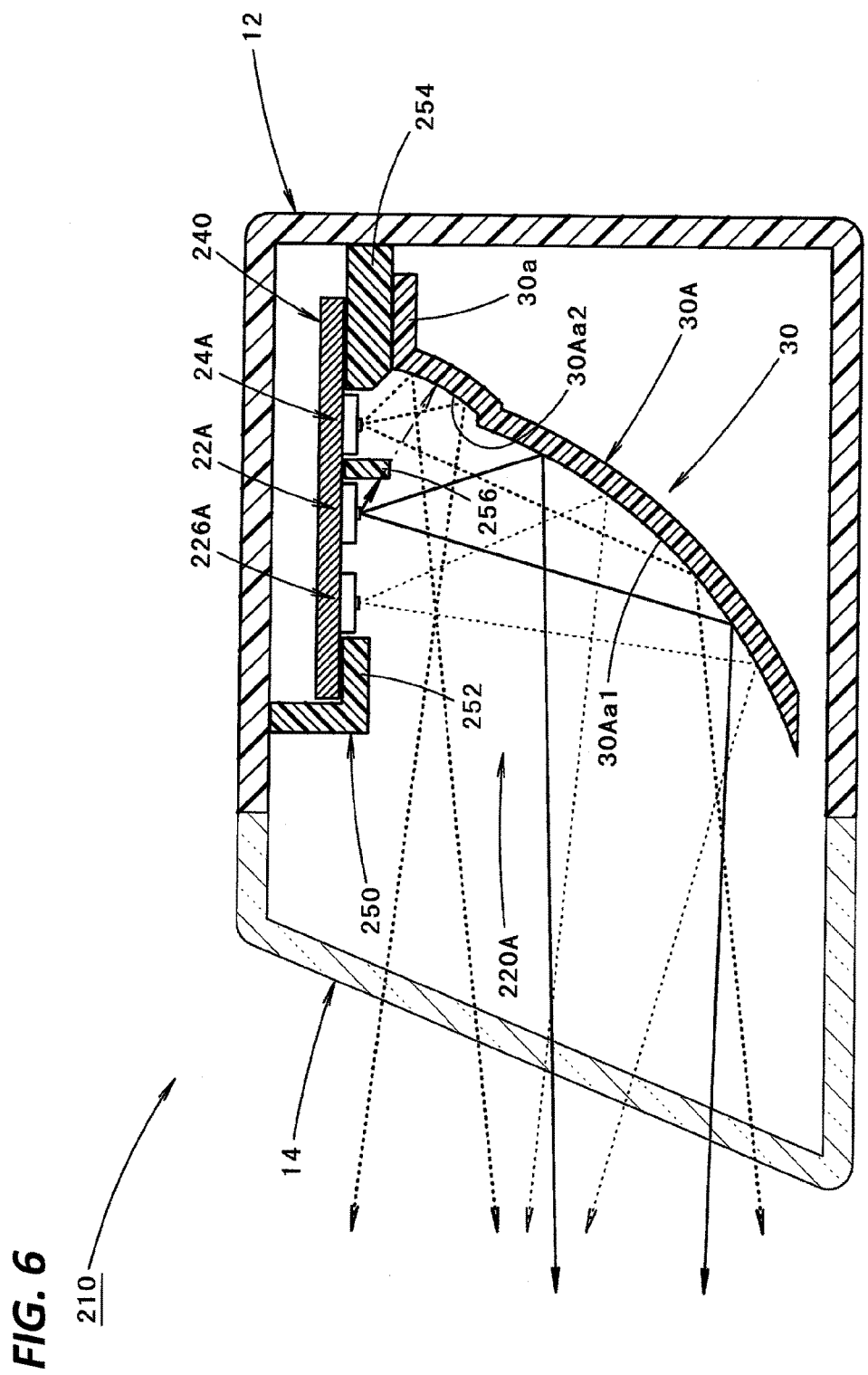
FIG. 6 is a view illustrating a second modification of the exemplary embodiment, which is the same as FIG. 2.

FIG. 6 is a view illustrating a vehicular lamp 210 according to the present modification, which is the same as FIG. 2.

As illustrated in FIG. 6, the basic configuration of the vehicular lamp 210 is the same as the vehicular lamp 10 according to the above-described exemplary embodiment, but the present modification is different from the above-described exemplary embodiment in that a sub light emitting element 226A is additionally arranged as a sub light source unit configured to be lit in the daytime running lamp lighting mode.

The sub light emitting element 226A is a white light emitting diode and is arranged downward on the front side of the first light emitting element 22A in the lamp unit 220A.

In the present modification, a substrate 240 on which the first and second light emitting elements 22A and 24A are mounted has a shape in which the substrate 40 of the above-described exemplary embodiment is extended forward, and the sub light emitting element 226A is also mounted on the lower surface of the substrate 40.

Since the sub light emitting element 226A is positioned in front of the first light emitting element 22A, the light emitted from the sub light emitting element 226A that is incident on the first reflective surface 30Aa1 is reflected as an obliquely upward light.

Further, in the present modification, since the sub light emitting element 226A is arranged, the support member 250 has a different shape from the lower surface of the thin-walled portion 252 in the above-described exemplary embodiment. However, the thick-walled portion 254 and the light-shielding portion 256 have the same shapes as in the above-described exemplary embodiment.

By adopting the configuration of the present modification, it is possible to cause the first reflective surface 30Aa1 to emit brighter light in the daytime running lamp lighting mode.

Next, a third modification of the present exemplary embodiment will be described.

Figure 7:
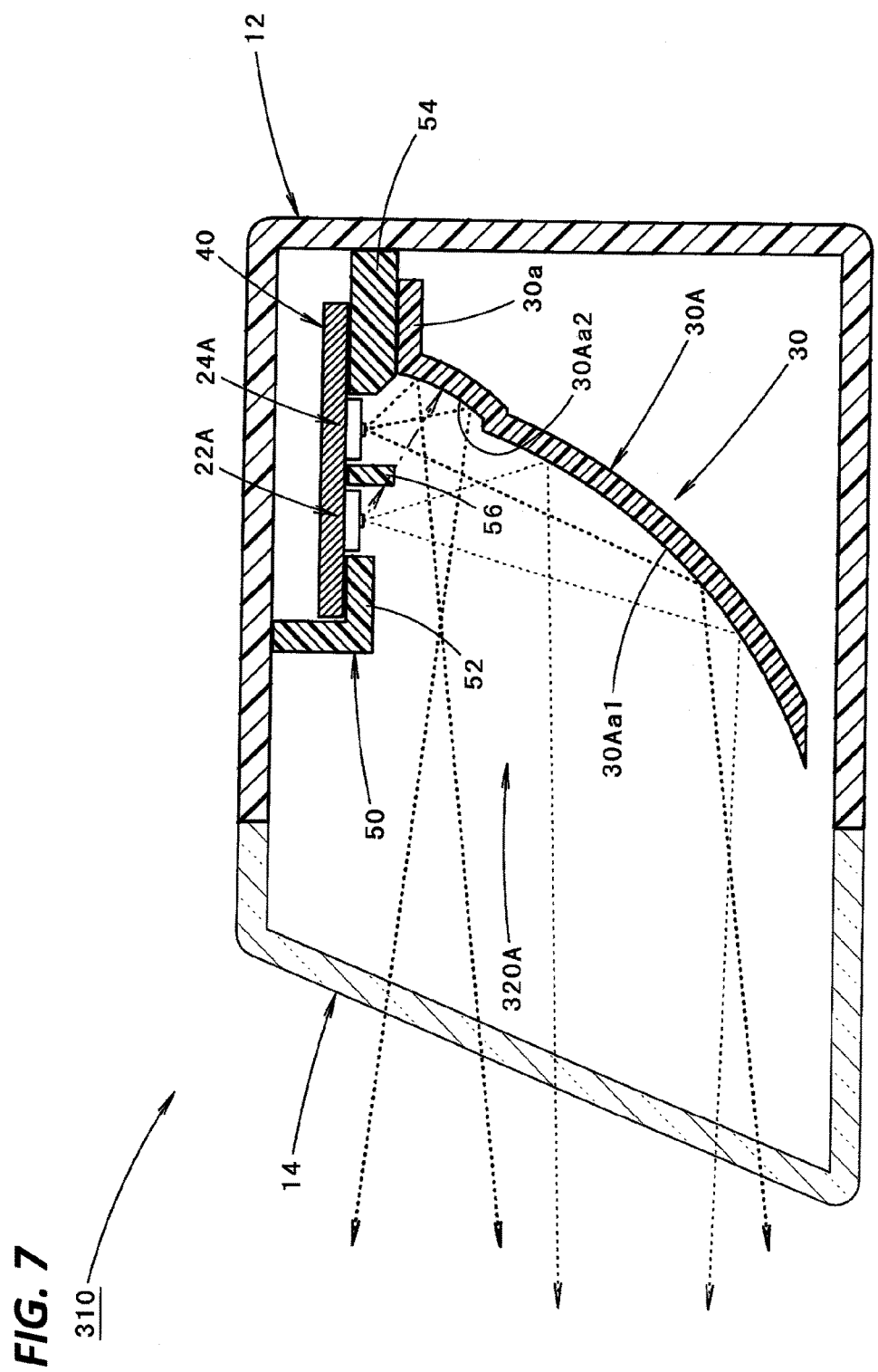
FIG. 7 is a view illustrating a third modification of the exemplary embodiment, which is the same as FIG. 2.

FIG. 7 is a view illustrating a vehicular lamp 310 according to the present modification, which is the same as FIG. 2.

As illustrated in FIG. 7, the basic configuration of the vehicular lamp 310 is the same as the vehicular lamp 10 according to the above-described exemplary embodiment, but the present modification is different from the above-described exemplary embodiment in that the first light emitting element 22A of the lamp unit 320A is configured to be lit in the daytime running lamp lighting mode in a dimmed state than the lighting time of the headlamp lighting mode.

That is, in the daytime running lamp lighting mode, the second light emitting element 24B is lit, and the first light emitting element 22A is dimmed. Accordingly, a light distribution pattern is formed as the daytime running lamp light distribution pattern, in which a light distribution pattern with a reduced brightness of the additional light distribution pattern PA illustrated in FIG. 4B is superimposed on the daytime running lamp light distribution pattern PD illustrated in FIG. 4C.

By adopting the configuration of the present modification, the reflector 30A may be caused to emit light over a wide range in the daytime running lamp lighting mode without using a new member.

Next, a fourth modification of the present exemplary embodiment will be described.

Figure 8:
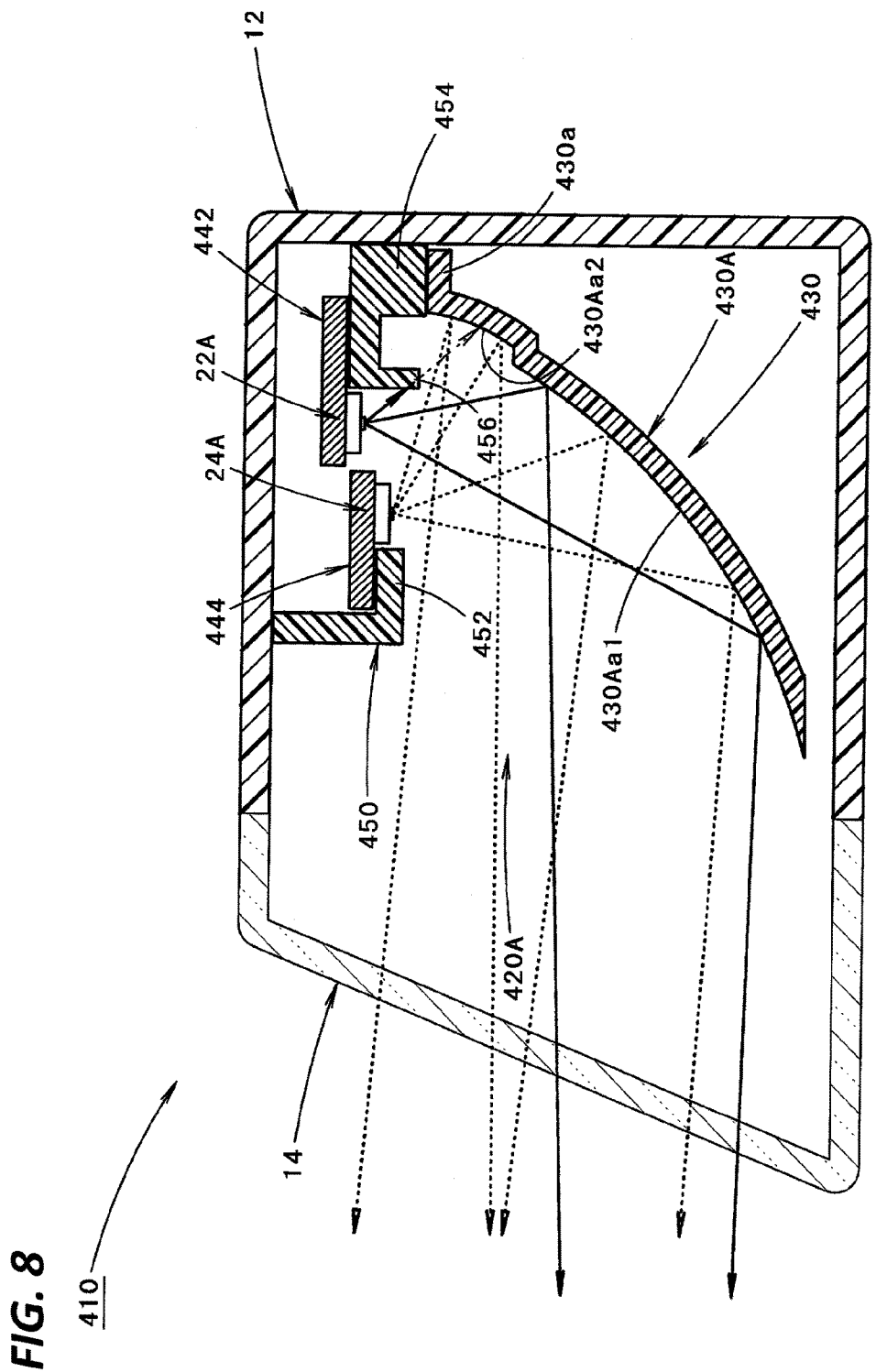
FIG. 8 is a view illustrating a fourth modification of the exemplary embodiment, which is the same as FIG. 2.

FIG. 8 is a view illustrating a vehicular lamp 410 according to the present modification, which is the same as FIG. 2.

As illustrated in FIG. 8, the basic configuration of the vehicular lamp 410 is the same as the vehicular lamp 10 according to the above-described exemplary embodiment. However, the present modification is different from the above-described exemplary embodiment in that the positional relationship between the first and second light emitting elements 22A and 24A in the lamp unit 420A is reversed back and forth. Thus, the configurations of the reflector 430A (and the reflector continuous body 430), the substrates 442 and 444, and the support member 450 of the present modification are different from those of the above-described exemplary embodiment.

In the present modification, the second light emitting element 24A is positioned in the lower side of an incline on the front side with respect to the first light emitting element 22A. For this reason, the substrate 442 on which the first light emitting element 22A is mounted and the substrate 444 on which the second light emitting element 22B is mounted are formed as separate substrates.

In the present modification, the reflector 430A is formed in two upper and lower tiers so that the first reflective surface 430Aa1 is positioned on the lower side of the second reflective surface 430Aa2.

However, the first reflective surfaces 430Aa1 and the second reflective surface 430Aa2 of the present modification have different shapes from those of the above-described exemplary embodiment so that the first reflective surface 430Aa1 reflects the light emitted from the first light emitting element 22A toward the front of the vehicle as a slightly diffused light in the vertical direction and the second reflective surface 430Aa2 reflects the light emitted from the second light emitting element 24A toward the front of the vehicle as a slightly diffused light in the vertical direction.

The support member 450 includes a thin-walled portion 452, a thick-walled portion 454, and a light-shielding portion 456, but the shape thereof is greatly different from that in the above-described exemplary embodiment.

That is, the thin-walled portion 452 is positioned lower than that in the above-described exemplary embodiment and supports the substrate 444 on the upper surface thereof. The thick-walled portion 454 is formed to be thicker than that in the above-described exemplary embodiment and supports the substrate 442 on the upper surface thereof, while supporting the flange portion 430a of the reflector continuous body 430 on the lower surface thereof. Also, the light-shielding portion 456 is formed as a portion of the thick-walled portion 454 so as to be positioned near the rear side of the first light emitting element 22A in order to shield the light from the first light emitting element 22A to the second reflective surface 430Aa2 of the reflector 430A.

That is, even in the case of adopting the configuration of the present modification, after the first reflective surface 430Aa1 on which the light emitted from the first light emitting element 22A is incident is preferentially used as a reflective region configured to form the additional light distribution pattern PA for the high beam light distribution pattern PH, the first and second reflective surfaces 430Aa1 and 430Aa2 on which the light emitted from the second light emitting element 24A is incident may be used as reflective regions configured to form a daytime running lamp light distribution pattern PD.

At this time, since the light emitted from the first light emitting element 22A is not incident on the second reflective surface 430Aa2, the second reflective surface 430Aa2 may be used as a dedicated reflective region configured to form a daytime running lamp light distribution pattern PD.

Thus, after the high beam light distribution pattern PH and the daytime running lamp light distribution pattern PD may be efficiently formed, both the first and second reflective surfaces 430Aa1 and 430Aa2 may be caused to emit light in the daytime running lamp lighting mode.

In addition, it is to be understood that the numerical values illustrated as the specification in the above-described exemplary embodiment and modifications thereof are merely examples and the numerical values may be appropriately set to different values.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:
1. A vehicular lamp comprising:
a first light emitting element configured to be lit in a first lighting mode;
a second light emitting element configured to be lit in a second lighting mode; and
a reflector configured to reflect and control light emitted from the first and second light emitting elements,
wherein the reflector includes a first reflective surface and a second reflective surface, and
the light emitted from the first light emitting element is incident on the first reflective surface and not on the second reflective surface, and the light emitted from the second light emitting element is incident on the first and second reflective surfaces.

2. The vehicular lamp of claim 1, wherein the first lighting mode is a headlamp lighting mode, and the second lighting mode is a daytime running lamp lighting mode.

3. The vehicular lamp of claim 1, further comprising a light-shielding member configured to suppress the light emitted from the first light emitting element from being incident on the second reflective surface.

4. The vehicular lamp of claim 1, further comprising a sub-reflector configured to reflect a portion of the light which is emitted from the second light emitting element and reflected on the second reflective surface toward the first reflective surface.

5. The vehicular lamp of claim 1, wherein the first and second light emitting elements are mounted on a common substrate.

6. The vehicular lamp of claim 1, further comprising a sub light source unit configured to be lit in the second lighting mode and cause light to be incident on the first reflective surface.

7. The vehicular lamp of claim 1, wherein in the second lighting mode, the first light emitting element is configured to be lit in a state of being dimmed more than when the first light emitting element is lit in the first lighting mode.

* * * * *